CABINET FOR SEMICONDUCTORS WITH COOLING BLOCKS

Filed Oct. 21, 1966 2 Sheets-Sheet 1

INVENTOR.
Paul Schneider
BY
Pierce, Scheffler & Parker
ATTORNEYS

Sept. 26, 1967 P. SCHNEIDER 3,344,315
CABINET FOR SEMICONDUCTORS WITH COOLING BLOCKS
Filed Oct. 21, 1966 2 Sheets-Sheet 2

INVENTOR.
Paul Schneider
BY
Pierce, Scheffler & Parker
ATTORNEYS

United States Patent Office 3,344,315
Patented Sept. 26, 1967

3,344,315
CABINET FOR SEMICONDUCTORS WITH COOLING BLOCKS

Paul Schneider, Turgi, Switzerland, assignor to Aktiengesellschaft Brown, Boveri & Cie, Baden, Switzerland, a joint-stock company Filed Oct. 21, 1966, Ser. No. 588,486
6 Claims. (Cl. 317—100)

ABSTRACT OF THE DISCLOSURE

A cabineted semiconductor assembly comprises a cabinet structure within which is located a pair of vertically disposed banks of groups of semiconductor elements. The semiconductor groups of each bank are spaced from each other by insulator pieces and each semiconductor group is comprised of a plurality of semiconductor elements secured to a heat sink having cooling plates. The cabinet structure has side walls and a front wall but no back wall, and a fan unit mounted on the front wall serves to draw cooling air transversely through the cabinet structure and between the cooling plates of the semiconductor groups.

This application, which is a continuation-in-part of application Ser. No. 345,475, filed Feb. 17, 1964, and now abandoned, relates to semiconductor apparatus and more particularly to an improved cabinet structure for supporting one or more vertical banks of semiconductor elements in superposed relation in such manner as to enable the semiconductor banks to be installed or removed with relative ease, and also ensure an adequate flow of cooling air over the semiconductor elements.

A preferred embodiment of the invention will be hereinafter described and is illustrated in the accompanying drawings wherein.

Figure 1:
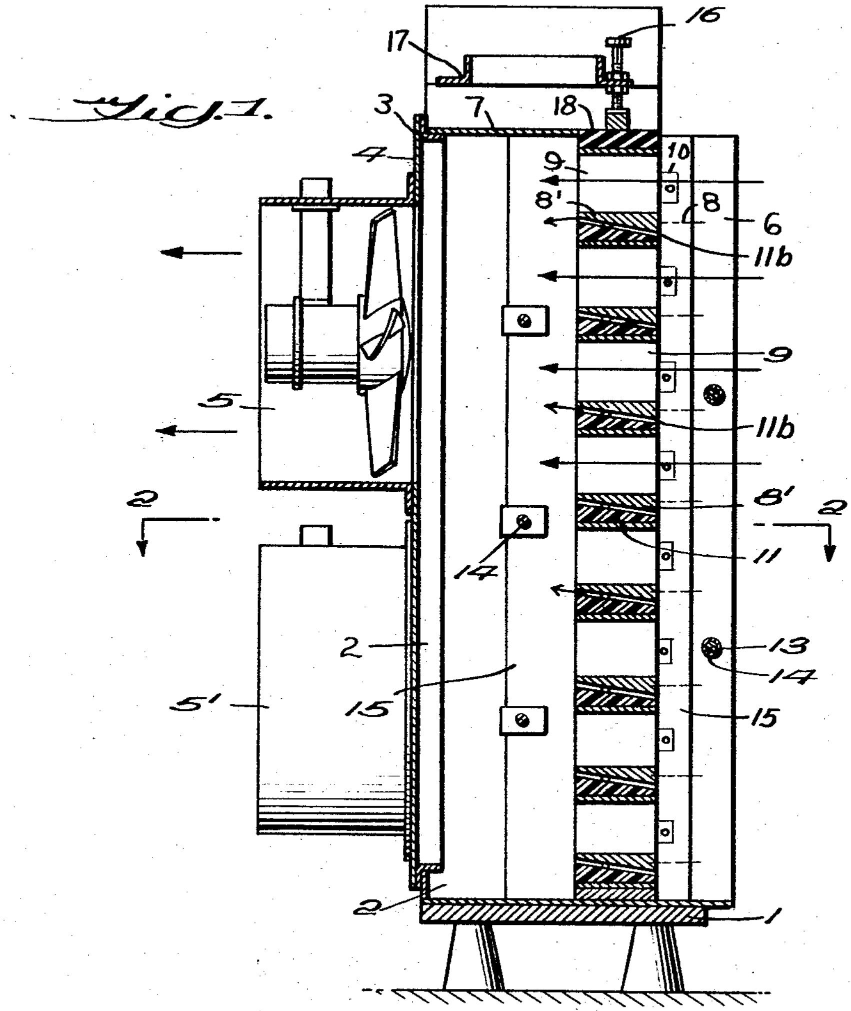
FIG. 1 is a vertical sectional view of the improved semiconductor cabinet structure taken on line I—I of FIG. 2.
Figure 2:
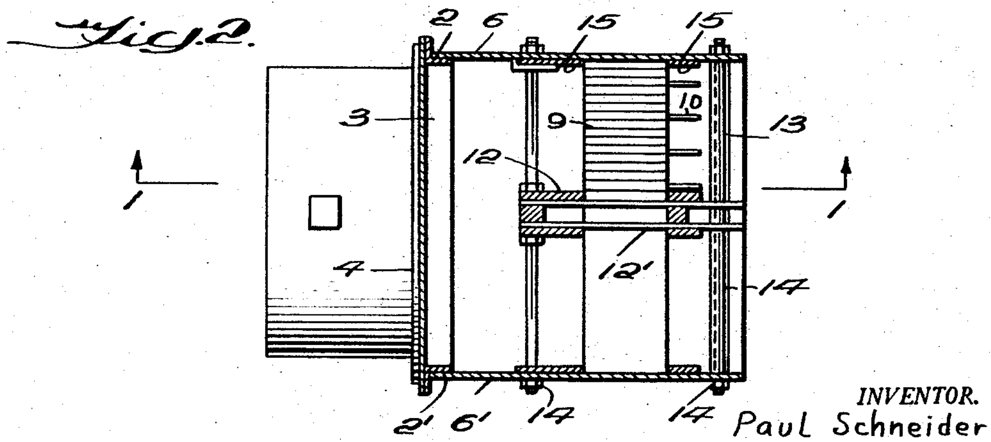
FIG. 2 is a view in top plan of the cabinet structure shown in FIG. 1.

Referring now to the drawings and to FIG. 1 in particular, the improved cabinet structure is comprised of a base 1. Upstanding at opposite sides of the front end of this base are angle irons 2, 2′ and these are bridged together at the top by a transverse angle iron 3. A front wall 4 of the cabinet is secured at the sides thereof to the vertical angle irons 2, 2′ and the housings of a pair of superposed suction fans 5, 5′ are mounted to the front wall 4, the latter being, of course, provided with the necessary cutouts so as to allow the flow of intake air into the fans.

Side walls 6, 6′ extend upwardly from opposite sides of the base 1 and the space between these side walls serves to accommodate two banks of vertically stacked semiconductor groups. The top wall of the cabinet is indicated at 7.

Figure 3:
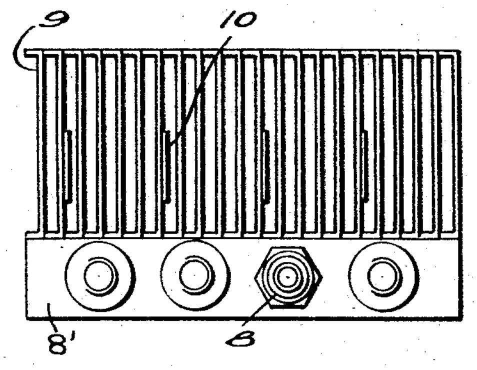
FIG. 3 is a view in front elevation of one group of semiconductor elements showing more of their structural details.

As shown in FIG. 3 each group of semiconductor elements is comprised of a plurality of semiconductor elements e.g. diodes 8 arranged in side-by-side relation and which are secured to a metallic base or heat sink 8′ which has an essentially trapezoidal configuration. Also, included for each group of the rectifier elements 8 is a bank of upstanding cooling plates 9 inserted into the heat sink 8′. Lugs for electrical connections to the semiconductor elements are indicated at 10.

Figure 4:
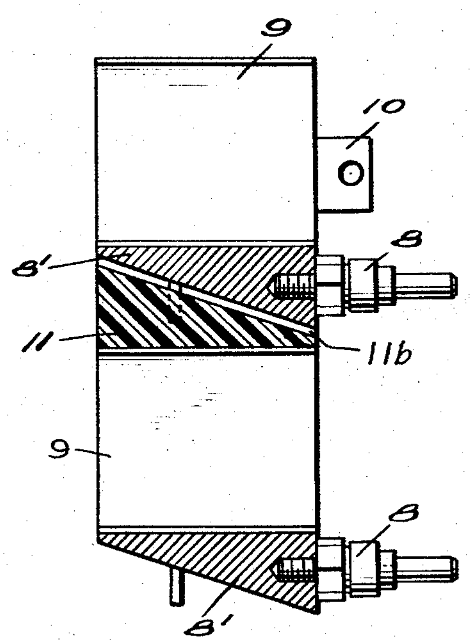
FIG. 4 is a side view showing more of the details of the manner in which the several groups of semiconductor elements are stacked one above the other to establish a vertical bank of semiconductors.

As shown in FIG. 4 the several groups or subassemblies of semiconductor elements are stacked one above the other and mutually insulated by means of a trapezoidally configured spacer piece 11 made from a suitable insulating material.

Figure 5:
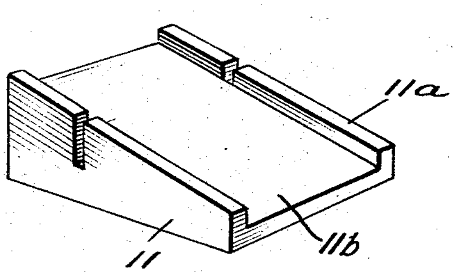
FIG. 5 is a view in perspective showing the details of construction of an insulating element which is interposed between adjacent groups of semiconductor elements.

As shown in FIG. 5, each spacer 11 is provided with side flanges **11*a* to support the underface of the base parts 8′ of the semiconductor elements next-above and to thereby establish a cooling channel 11*b* therebetween for the flow of cooling air from the back of the cabinet to the front where it enters the suction fans 5, 5′. The top wall of each spacer piece 11 is inclined to match the inclined lower face of the base 8′ of each semiconductor group, and the bottom wall of each spacer piece 11 is horizontal so as to lie flat against the upper edges of the cooling plates 9** of the semiconductor group next below.

As shown in FIG. 1 the several groups of semiconductor elements are stacked one above the other on the base of the cabinet between the side walls 6, 6′.

In the illustrated embodiment, two vertical banks of semiconductor elements are provided and these rise from the base in essentially side-by-side relation; the two banks are separated from each other by partition members 12, 12′ located parallel with the side walls 6, 6′.

For securing the side walls 6, 6′ in the desired parallel spaced relation, transverse spacer sleeves 13 and tie rods 14 are provided at several levels between the bottom and top of the cabinet. Also, to maintain the banks of semiconductor elements against any lateral displacement, retainer strips 15 extend vertically along the inner faces of side walls 6, 6′ and partitions 12, 12′ and these abut the front and rear faces of the semiconductor groups.

If desired, vertical stability of the two banks of semiconductor elements may be assured by use of screw-down bolts 16 mounted on an angle frame 17 at the upper end of the main frame structure, the lower ends of these bolts being brought into pressure contact with the top side of the cooling plates of the uppermost group of semiconductor elements and preferably with an insulating plate 18 interposed therebetween.

The improved cabinet structure permits relatively easy installation of the groups of semiconductor elements and the channels established beneath the base part of each semiconductor group provide for a flow of additional air through the cabinet which supplements the main cooling air flow which passes through the cabinet from the open back and the upstanding cooling plates 9 to the intake of the suction fans.

I claim:

1. In a cabineted semiconductor assembly the combination comprising a cabinet structure having bottom, top, front and side walls but no rear wall, said front wall being provided with an opening, at least one vertical bank of superposed groups of semiconductor elements rising from said bottom wall of said cabinet structure, each said semiconductor group being comprised of a plurality of semiconductor elements disposed in side-by-side relation, a metallic base forming a heat sink and to which the semiconductor elements of the group are secured and a plurality of spaced cooling plates extending vertically from said base and parallel with said side walls of said cabinet structure, insulator pieces interposed respectively between adjacent semiconductor groups, opposite faces of each said spacer piece engaging respectively the base of one semiconductor group and the edges of the cooling plates of the next semiconductor groups in the bank, and a fan unit mounted on said front wall of said cabinet structure with its intake in communication with the opening in said front wall, said fan unit serving to draw cooling air transversely through said cabinet structure and between said cooling plates of said semiconductor groups.

2. A cabineted semiconductor assembly as defined in claim 1 and wherein each of said spacer pieces includes means establishing a channel for flow of cooling air between one face thereof and the base of the semiconductor group with which it is engaged.

3. A cabineted semiconductor assembly as defined in claim 2 wherein said channel is inclined and said bases and spacer pieces have a trapezoidal configuration.

4. A cabineted semiconductor assembly as defined in claim 1 and which further includes means for applying an end pressure to said bank of semiconductor elements.

5. A cabineted semiconductor assembly as defined in claim 1 and which further includes spacer sleeves and associated tie rods extending between said side walls of said cabinet structure and which maintain said side walls in position.

6. A cabineted semiconductor assembly which comprises two vertical semiconductor banks each as defined in claim 1 and which further includes partition walls arranged intermediate the two semiconductor banks and parallel with said side walls of said cabinet structure.

References Cited

UNITED STATES PATENTS

| | | | |
|---|---|---|---|
| 2,171,643 | 9/1939 | Brenkert | 317—100 |
| 2,815,472 | 12/1957 | Jackson et al. | 317—100 X |
| 2,986,679 | 5/1961 | Storsand | 317—100 X |

ROBERT K. SCHAEFER, *Primary Examiner.*

M. GINSBURG, *Assistant Examiner.*